US008789125B2

(12) United States Patent  
Yabe

(10) Patent No.: US 8,789,125 B2
(45) Date of Patent: Jul. 22, 2014

(54) INFORMATION PROCESSING DEVICE, INFORMATION PROCESSING METHOD AND PROGRAM

(75) Inventor: Toshiharu Yabe, Tokyo (JP)

(73) Assignee: Sony Corporation, Tokyo (JP)

( * ) Notice: Subject to any disclaimer, the term of this patent is extended or adjusted under 35 U.S.C. 154(b) by 1405 days.

(21) Appl. No.: 12/119,755

(22) Filed: May 13, 2008

(65) Prior Publication Data

US 2008/0288988 A1 Nov. 20, 2008

(30) Foreign Application Priority Data

May 15, 2007 (JP) ................................ P2007-129364

(51) Int. Cl.
*H04N 7/173* (2011.01)
*G06F 3/00* (2006.01)
*G06F 13/00* (2006.01)
*H04N 5/445* (2011.01)
*H04N 21/482* (2011.01)
*H04N 21/472* (2011.01)
*H04N 21/8405* (2011.01)

(52) U.S. Cl.
CPC ......... *H04N 21/4828* (2013.01); *H04N 21/472* (2013.01); *H04N 21/8405* (2013.01)
USPC ............................................. 725/131; 725/37

(58) Field of Classification Search
None
See application file for complete search history.

(56) References Cited

U.S. PATENT DOCUMENTS

| 6,289,346 | B1 * | 9/2001 | Milewski et al. ................. 1/1 |
| 6,349,340 | B1 * | 2/2002 | Dyer et al. .................. 709/231 |
| 6,865,746 | B1 * | 3/2005 | Herrington et al. ............. 725/53 |
| 7,765,549 | B1 * | 7/2010 | Lauer ............................ 718/101 |
| 2001/0004739 | A1 | 6/2001 | Sekiguchi et al. |
| 2003/0028896 | A1 * | 2/2003 | Swart et al. ................... 725/127 |
| 2005/0243740 | A1 | 11/2005 | Chen et al. |
| 2007/0271340 | A1 * | 11/2007 | Goodman et al. ............. 709/206 |

FOREIGN PATENT DOCUMENTS

| JP | 5-28195 | 2/1993 |
| JP | 11-259493 | 9/1999 |
| JP | 2005-57713 | 3/2005 |
| JP | 2005 353039 | 12/2005 |
| JP | 2006 18831 | 1/2006 |
| JP | 2006-33659 | 2/2006 |
| JP | 2006-59133 | 3/2006 |
| JP | 2006-525584 | 11/2006 |

* cited by examiner

*Primary Examiner* — Mark D Featherstone
(74) *Attorney, Agent, or Firm* — Oblon, Spivak, McClelland, Maier & Neustadt, L.L.P.

(57) ABSTRACT

An information processing device which shares program information specifying a program with other devices connected through a network is disclosed. The device includes: a program information receiving means for receiving the program information the accumulation of which is allocated to the information processing device; a program information storage means for storing the program information; a search request receiving means for receiving a search request which requests program information specifying a program from which a search keyword inputted to another device has been extracted as the feature amount; a determination means for determining whether the program information requested by the search request is stored in the program information storage means; and a transmission means for transmitting program information requested by the search request to another device which has transmitted the search request when that program information requested by the search request is stored in the program information storage means.

10 Claims, 7 Drawing Sheets

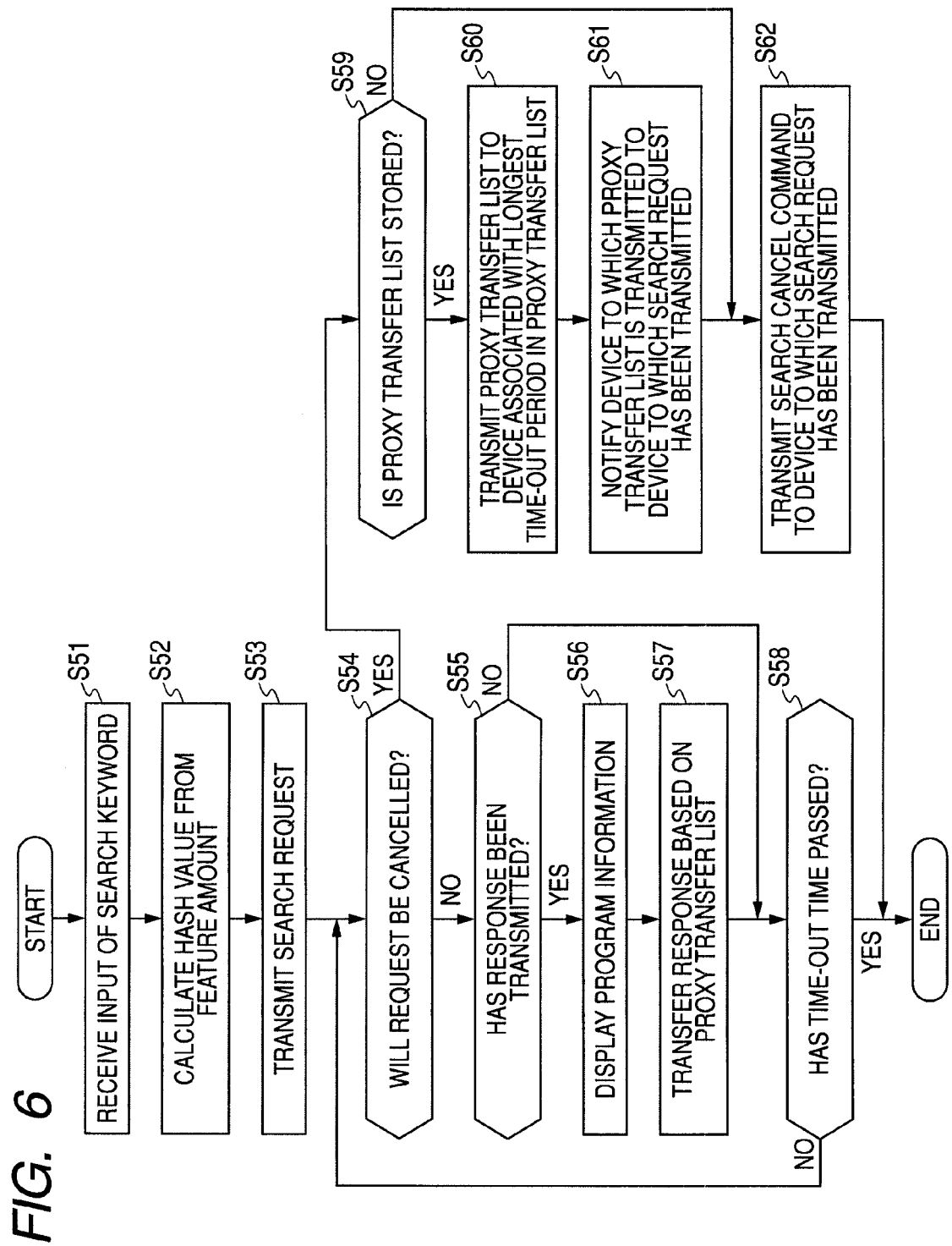

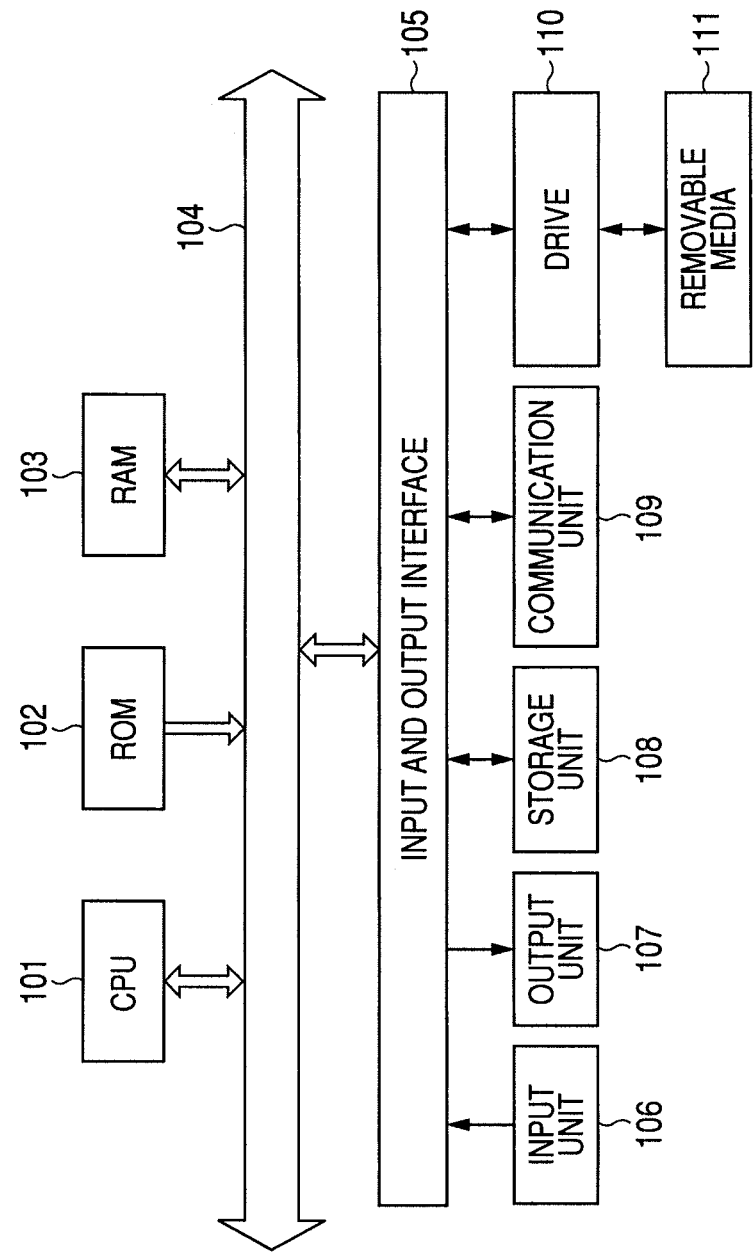

INFORMATION PROCESSING DEVICE, INFORMATION PROCESSING METHOD AND PROGRAM

CROSS REFERENCE TO RELATED APPLICATIONS

The present invention contains subject matter related to Japanese Patent Application JP 2007-129364 filed in the Japanese Patent Office on May 15, 2007, the entire contents of which being incorporated herein by reference.

BACKGROUND OF THE INVENTION

1. Field of the Invention

The invention relates to an information processing device, an information processing method and a program, and particularly relates to an information processing device, an information processing method and a program capable of allowing a user to watch desired scenes efficiently.

2. Description of the Related Art

In recent years, due to the multichannel service of broadcasting programs by digital television broadcast, the number of programs which can be watched by the user (viewer) is increasing.

On the other hand, viewing time which can be spent for watching programs by the user is limited. Therefore, if a desired scene, for example, a scene in which a favorite performer appears is broadcasted during the limited viewing time, the user would like to select a channel on which the scene is broadcasted and to watch the desired scene efficiently.

However, there are so many programs on air, and it was difficult that the user searches the desired scene from all programs on air.

In JP-A-2006-18831 (Patent Document 1), there is disclosed a search system in which a feature amount and attribute information are extracted from video to efficiently search the video by using the feature amount and the attribute information.

In JP-A-2005-353039 (Patent Document 2), there is disclosed a method of building data overlay including objects as a data structure on a theoretical space defined by Distributed Hash Table in a network built by peer-to-peer.

SUMMARY OF THE INVENTION

As described above, it was difficult to search a desired scene from many programs on air, therefore, it was difficult to efficiently watch desired scenes.

Thus, it is desirable to allow the user to efficiently watch desired scenes.

An information processing device according to an embodiment of the invention is an information processing device which shares program information specifying a program with other devices connected through a network including a program information receiving means for receiving the program information the accumulation of which is allocated to the information processing device based on a feature amount extracted from the program, a program information storage means for storing the program information received by the program information receiving means, a search request receiving means for receiving a search request which requests program information specifying a program from which a search keyword inputted to another device has been extracted as the feature amount and the information processing device is allowed to be a transmission destination based on the search keyword, a determination means for determining whether the program information requested by the search request received by the search request receiving means is stored in the program information storage means or not, and a transmission means for transmitting program information requested by the search request to another device which has transmitted the search request when it is determined by the determination means that program information requested by the search request is stored in the program information storage means.

An information processing method or a program according to an embodiment of the invention is an information processing method of an information processing device which shares program information specifying a program with other devices connected through a network, or a program allowing a computer to execute information processing of an information processing device which shares program information specifying a program with other devices connected through a network including the steps of receiving the program information the accumulation of which is allocated to the information processing device based on a feature amount extracted from the program, storing the program information the accumulation of which is allocated to the information processing device in a program information storage means for storing the program information, receiving a search request which requests program information specifying a program from which a search keyword inputted to another device has been extracted as the feature amount and whose transmission destination is allowed to be the information processing device based on the search keyword, determining whether the program information requested by the search request is stored in the program information storage means or not, and transmitting program information requested by the search request to another device which has transmitted the search request when it is determined that program information requested by the search request is stored in the program information storage means.

According to an embodiment of the invention, program information the accumulation of which is allocated to the information processing device is received based on a feature amount extracted from a program, and the program information is stored in the program information storage means. Also, when receiving a search request which requests program information specifying the program from which a search keyword inputted to another device was extracted as a feature amount and whose transmission destination is allowed to be the information processing device based on the search keyword, it is determined that whether program information requested by the search request is stored in the program information storage means or not. When it is judged that the program information requested by search request is stored in the program information storage means, program information requested by the search request is transmitted to another device which has transmitted the search request.

According to the embodiment of the invention, it is possible to allow the user to watch desired scenes efficiently.

BRIEF DESCRIPTION OF THE DRAWINGS

FIG. 6 is a flowchart explaining processing that the information processing device 12 transmits a search request; and FIG. 7 is a block diagram showing a configuration example of a personal computer.

DESCRIPTION OF THE PREFERRED EMBODIMENTS

Figure 1:
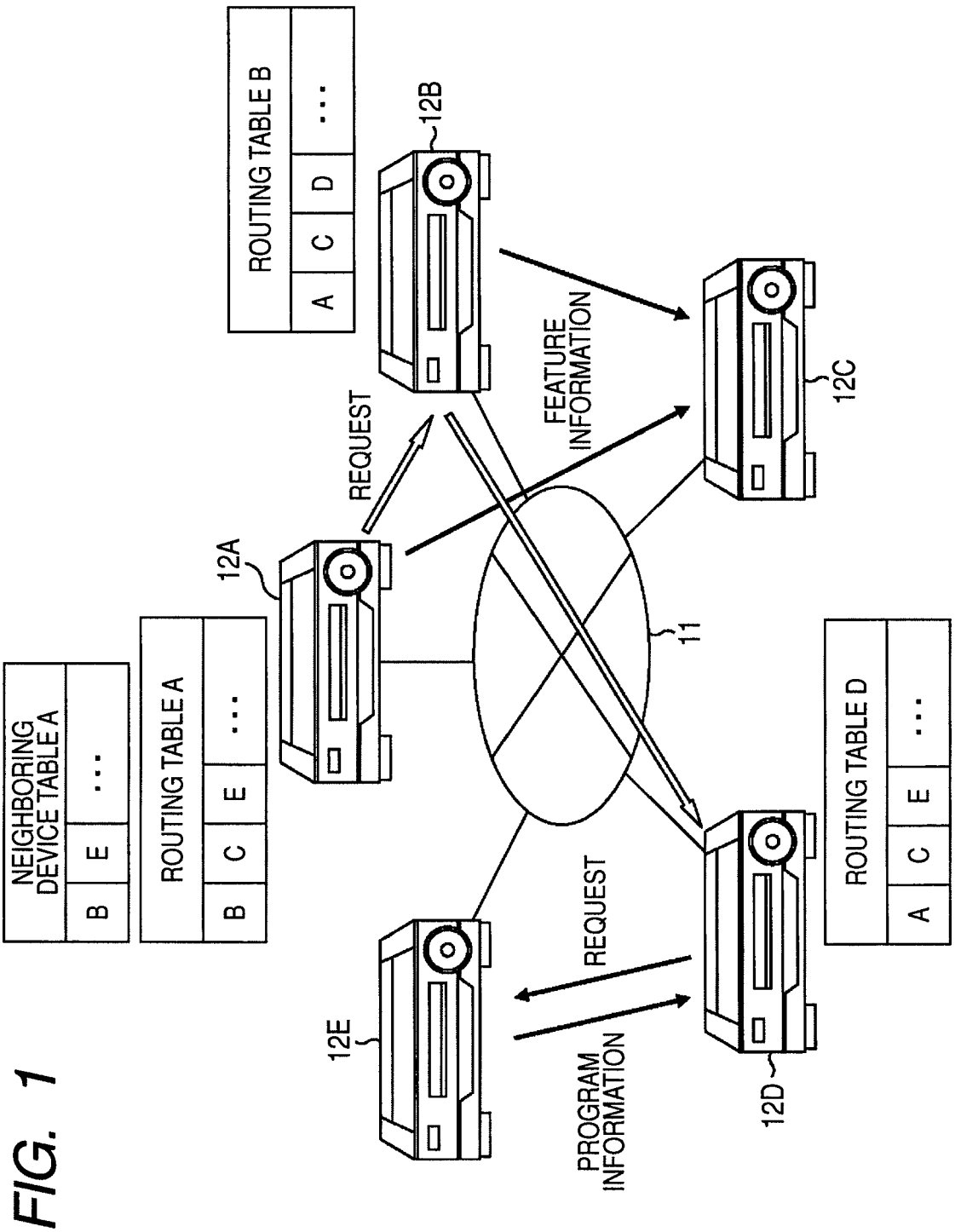
FIG. 1 is view showing a configuration example according to an embodiment of an information processing system to which the invention is applied.

Embodiments of the invention will be explained below, and the correspondence between constituent features of the invention and the embodiment described in the specification or the drawings is exemplified as follows. The description is for confirming that the embodiment supporting the invention is described in the specification or the drawings. Therefore, if there is an embodiment which is described in the specification or the drawings but not described here as the embodiment corresponding to the constituent feature of the invention, that does not mean that the embodiment does not correspond to the constituent feature. On the other hand, even when the embodiment is described here as the embodiment corresponding to the constituent feature, that does not mean that the embodiment does not correspond to constituent features other than the constituent feature.

An information processing device according to an embodiment of the invention is the information processing device which shares program information specifying a program with other devices connected through a network includes a program information receiving means (for example, a receiving unit 26 in FIG. 2) for receiving the program information the accumulation of which is allocated to the information processing device based on a feature amount extracted from the program, a program information storage means (for example, a list storage unit 28 of FIG. 2) for storing the program information received by the program information receiving means, a search request receiving means (for example, the receiving unit 26 in FIG. 2) for receiving a search request which requests program information specifying a program in which a search keyword inputted to another device has been extracted as the feature amount and whose transmission destination is allowed to be the information processing device based on the search keyword, a determination means (for example, a control unit 29 of FIG. 2 which executes processing of Step S28 of FIG. 4) for determining whether the program information requested by the search request received by the search request receiving means is stored in the program information storage means or not, and a transmission means (for example, a transmission unit 25 of FIG. 2) for transmitting program information requested by the search request to another device which has transmitted the search request when it is determined by the determination means that program information requested by the search request is stored in the program information storage means.

The information processing device according to an embodiment of the invention further includes a search request list storage means (for example, the list storage unit 28 in FIG. 2) for storing a search request list in which search requests received by the search request receiving means are registered, in which the determination means further determines whether the program information received by the program information receiving means is requested in search requests already registered in the search request list or not, and the transmission means transmits program information requested by the search request to another device which has transmitted the search request when it is determined by the determination means that the program information received by the program information receiving means is requested in search requests already registered in the search request list.

In the information processing device according to an embodiment of the invention, the search request includes time-out time designating the limit until which the request of the program information is valid, and the device further includes a search request cancellation means (for example, a list management unit 27 of FIG. 2 which executes the processing of Step S22 of FIG. 4) for canceling the search request in which the limit designated by the time-out time has passed from the search request list by referring to the search request list stored in the search request list storage means.

The information processing device according to an embodiment of the invention further includes a proxy transfer list creation means (for example, the list management unit 27 of FIG. 2 which executes the processing of Step S42 of FIG. 5) for creating a proxy transfer list made by extracting part of search requests from the search request list when the number of search requests registered in the search request list stored in the search request list storage means is equal to or exceeds a predetermined upper limit value, and a proxy transfer list transmission means (for example, the transmission unit 25 of FIG. 2 which executes the processing of Step S43 of FIG. 5) for transmitting the proxy transfer list to one of other devices which have transmitted the search requests registered in the search request list.

The information processing device according to an embodiment of the invention further includes a keyword acquisition means (for example, an operation unit 21 of FIG. 2) for acquiring a search keyword inputted by the user, a calculation means (for example, a calculation processing unit 24 of FIG. 2) for calculating a hush function and outputting a hush value, taking the search keyword acquired by the keyword acquisition means as an input value, and a specifying means (for example, the control unit 29 of FIG. 2 which executes the processing of Step S53 of FIG. 6) for specifying a device to which the accumulation of program information is allocated, which specifies a program from which the search keyword has been extracted as a feature amount, in which the transmission means further transmits a search request requesting program information which specifies the program from which the search keyword has been extracted as the feature amount to the device specified by the specifying means.

The information processing device according to an embodiment of the invention further includes a program receiving means (for example, a tuner 22 of FIG. 2) for receiving the program and the program information which specifies the program, a feature amount extraction means (for example, a feature amount extraction unit 23 of FIG. 2) for extracting a feature amount from the program received by the program receiving means, a calculation means (for example, a calculation processing unit 24 of FIG. 2) for calculating a hush function and outputting a hush value, taking the feature amount extracted by the feature amount extraction means as an input value, and a specifying means (for example, the control unit 29 of FIG. 2 which executes the processing of Step S15 of FIG. 3) for specifying a device to which the accumulation of program information is allocated, which specifies the program from which the feature amount extraction means has extracted the feature amount based on the hush value outputted from the calculation means, in which the transmission means further transmits program information which specifies the program in which the feature amount extraction means has extracted the feature amount to the device specified by the specifying means.

An information processing method or a program according to an embodiment of the invention is an information processing method of an information processing device which shares program information specifying a program with other devices connected through a network, or a program allowing a computer to execute information processing of an information processing device which shares program information specifying a program with other devices connected through a network including the steps of receiving the program information (for example, Step S21 of FIG. 4) the accumulation of which is allocated to the information processing device based on a feature amount extracted from the program, storing the program information (for example, Step S32 of FIG. 4) the accumulation of which is allocated to the information processing device in a program information storage means for storing the program information, receiving a search request (for example, Step S21 of FIG. 4) which requests program information specifying a program from which a search keyword inputted to another device has been extracted as the feature amount and whose transmission destination is allowed to be the information processing device based on the search keyword, determining whether the program information requested by the search request is stored in the program information storage means or not (for example, Step S28 of FIG. 4), and transmitting program information (for example, Step S29 of FIG. 4) requested by the search request to another device which has transmitted the search request when it is determined that program information requested by the search request is stored in the program information storage means.

Hereinafter, a specific embodiment to which the invention is applied will be explained in detail with reference to the drawings.

FIG. 1 is a view showing a configuration example of an embodiment of an information processing system (a system indicates an object in which plural devices are logically gathered, and whether devices of respective configurations are in the same body or not is regardless) to which the invention is applied.

In FIG. 1, the information processing system includes a network 11 and five information processing devices 12A to 12E.

The network 11 includes various networks such as Internet, a LAN (Local Area Network), telephone lines, and a CATV (cable television), and the information processing devices 12A to 12E are respectively connected to the network 11.

The information processing devices 12A to 12E receive programs broadcasted at channels selected by respective users, displaying the programs on display units (for example, a later-described display unit 32 of FIG. 2) as well as performing processing of extracting feature amounts from the programs received by respective devices.

The information processing devices 12A to 12E transmit and receive feature information including a feature amount extracted from a program and program information specifying the program from which the feature amount was extracted, accumulating program information of the program from which a certain feature amount is extracted in a device specified based on the feature amount.

For example, when a performer A appears on a program received by the information processing devices 12A and 12B, the information processing devices 12A and 12B extract a name of the performer A as a feature amount from the program, and specifies the device to be a transmission destination of feature information by using the name of the performer A as the feature amount. For example, the transmission destination of the feature information is the information processing device 12C, the information processing devices 12A, 12B transmit feature information including the feature amount extracted from the program and program information of the program from which the feature amount was extracted to the information processing device 12C. Accordingly, program information of programs on which the performer A appears is accumulated in the information processing device 12C.

When the user inputs a performer's name as a search keyword in order to search programs in which the performer appears, the information processing devices 12A to 12E transmit a search request which requests program information of programs on which the performer appears to a device specified based on the performer's name.

For example, when a device in which program information of programs on which a performer B appears is accumulated is the information processing device 12E, the user of the information processing device 12D inputs the name of the performer B as a search keyword in the information processing device 12D. In this case, the information processing device 12D transmits the search request which requests program information of a program in which the performer B appears to the information processing device 12E specified as the transmission destination of the search request by using the name of the performer B. The information processing device 12E, when storing program information of the program in which the performer B appears, transmits the program information to the information processing device 12D. The information processing device 12D notifies the user of a channel of the program on which the performer B appears based on the program information from the information processing device 12E, accordingly, the user can watch the program on which the performer B appears by selecting the channel.

The information processing devices 12A to 12E can accumulate feature information in specified devices by using a DHT (Distributed Hash Table) algorithm even when they do not store information for specifying respective devices (hereinafter refers to as device IDs) with respect to all devices connected to the network 11.

Each of the information processing devices 12A to 12E, when connecting to the network 11 (hereinafter, refers to as "to participate in a cluster"), respectively creates and stores a routing table referred when finding a route through which feature information is transmitted according to the DHT algorithm. The device IDs of specified devices found according to the DHT algorithm in devices which participate in the cluster are registered in the routing table.

For example, in the DHT algorithm, many device IDs which are close to the device ID of the device are registered and a few device IDs which are far from the device ID of the device are registered in a routing table of the specified device. The specified device acquires device IDs to be registered in the routing table from specific devices which have already participated in the cluster when the device participates in the cluster. Each device which participates in the cluster calculates a hash function to find a hash value, taking the feature amount extracted from the program as an input value, and specifies the device having the device ID which is closest to the hash value calculated from the feature amount as a transmission destination of feature information by referring the routing table.

The device received feature information refers to the routing table stored by itself, and accumulates the feature information when the device ID of itself is closest to the hash value calculated from the feature amount included in the transmitted feature information. On the other hand, when a device ID closer to the hash value than the device ID of itself is registered in the routing table, the device received the feature information transfers the feature information to the device having the device ID closest to the hash value.

Accordingly, the route through which feature information is transmitted is found by using the DHT algorithm, and when a feature amount is extracted from a certain program, program information of the program is accumulated in the device having the device ID closest to the hash value found from the feature amount.

In the same manner that the route through which feature information is transmitted is found, a route through which a search request is transmitted is also found by using the DHT algorithm. For example, when the user inputs a performer's name as a search keyword, a search request is transmitted to a device which accumulates program information of programs in which the performer appears through the route found by using the DHT algorithm.

For example, when the hash function is calculated, taking the search keyword inputted by the user of the information processing device 12A as an input value and a device ID closest to the hash value found by the calculation is the device ID of the information processing device 12B registered in the routing table of the information processing device 12A, the information processing device 12A transmits a search request to the information processing device 12B. Then, the device ID of the information processing device 12D is registered in the routing table of the information processing device 12B as the device ID closest to the hash value obtained from the search keyword included in the search request from the information processing device 12A, the information processing device 12B transfers the search request to the information processing device 12D.

The feature information accumulated in the information processing device 12D is transmitted to the information processing device 12D through the route which was found in the same manner as in the route through which the search request is transmitted, therefore, program information requested by the search request transmitted by the information processing device 12A is accumulated in the information processing device 12D. Accordingly, the information processing device 12D is capable of transmitting program information as a response to the search request transmitted by the information processing device 12A.

Each of the information processing devices 12A to 12E can respectively stores a neighboring device table in which device IDs specifying close devices in the network (for example, devices whose communication delay time is short in communication processing) are registered. The information processing devices 12A to 12E can find a route which can shorten time necessary for communication by using the DHT algorithm as well as using the neighboring device table, as a result, the devices can transmit feature information and the search request more radidly.

The information processing devices 12A to 12E have the same configuration, and when it is not necessary that respective information processing devices 12A to 12E are individually distinguished, they are referred to as the information processing device 12.

Figure 2:
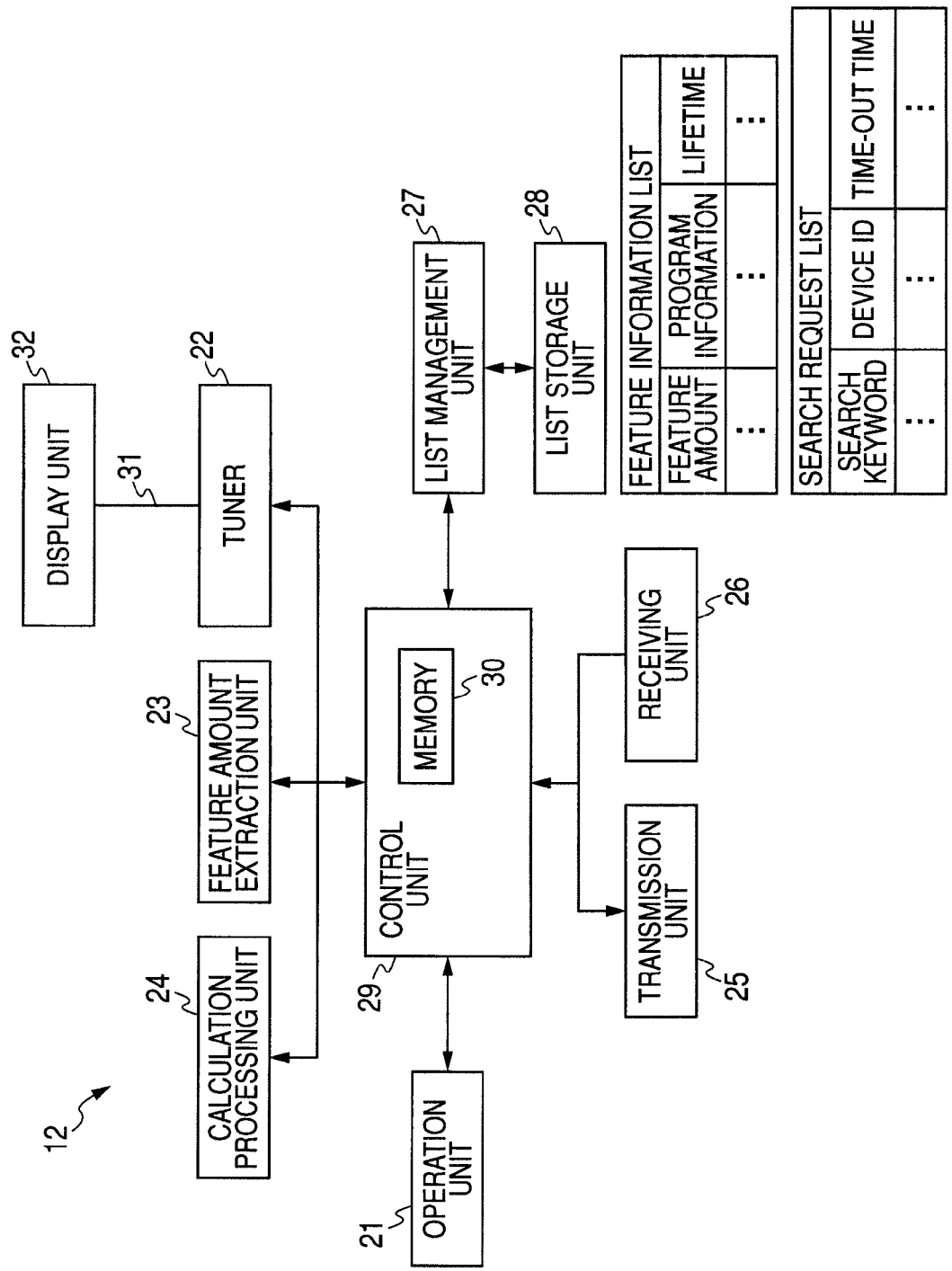
FIG. 2 is a block diagram showing a configuration example of an information processing device 12.

Next, FIG. 2 is a block diagram showing a configuration example of the information processing device 12 in FIG. 1.

In FIG. 2, the information processing device 12 includes an operation unit 21, a tuner 22, a feature amount extraction unit 23, a calculation processing unit 24, a transmission unit 25, a receiving unit 26, a list management unit 27, a list storage unit 28 and a control unit 29. A display unit 32 including a CRT (Cathode Ray Tube), an LCD (Liquid Crystal Display) or the like is connected to the tuner 22 of the information processing device 12 through a video cable 31.

The operation unit 21 includes not-shown switch buttons and the like, operated by the user and supplying an operation signal corresponding to the operation by the user to the control unit 29.

Broadcast signals received by a not-shown antenna are supplied to the tuner 22. The tuner 22 selects a broadcast signal of a desired channel from broadcast signals supplied there and demodulates the broadcast signal in accordance with control of the control unit 29. The tuner 22 supplies a program obtained as a result of demodulating the broadcast signal to the display unit 32 through the video cable 31 to be displayed thereon, supplying the program also to the feature amount extraction unit 23. The tuner 22 acquires program information which specifies a program by demodulating the broadcast signal, supplying the program information to the control unit 29.

The feature extraction unit 23 analyzes the program supplied from the tuner 22, extracting a feature amount as an analysis result from the program. For example, the feature extraction unit 23 extracts a telop superimposed on video of the program, extracting text data obtained by making text from the telop or text data of a performer's name obtained by recognizing a performer's face appearing on the program and referring to a given database based on the face as a feature amount. Then, the feature amount extraction unit 23 supplies the feature amount extracted from the program to the calculation processing unit 24 and the control unit 29.

The calculation processing unit 24 calculates a hash function, taking the feature amount supplied from the feature amount extraction unit 23 as an input value, supplying the hash value obtained by the calculation to the control unit 29.

When the user operates the operation unit 21 and inputs, for example, a performer's name to the information processing device 12 as a search keyword, the performer's name is supplied to the calculation processing unit 24 from the operation unit 21 through the control unit 29. In this case, the calculation processing unit 24 calculates the hash function, taking the performer's name inputted by the user as a input value and supplies the hash value obtained as the result of calculation to the control unit 29.

The transmission unit 25, according to the control unit 29, transmits feature information including program information of the program, for example, received by the tuner 22 and the feature amount extracted from the program by the feature amount extraction unit 23 to a device specified by the control unit 29 as a transmission destination according to the hash value calculated by the calculation processing unit 24 through the network 11 of FIG. 1. The transmission unit 25 also transmits a search request requesting program information of programs on which the performer appears to a device specified by the control unit 29 as the transmission destination according to the hash value calculated by the calculation processing unit 24 from the performer's name inputted by the user.

The feature information transmitted by the transmission unit 25 includes a device ID specifying the information processing device 12 which has transmitted feature information, in addition to program information and the feature amount. The program information includes a channel ID specifying a channel on which the program is broadcasted, program start time indicating time at which broadcast of the program is started or other information defined by standards such as an operational standard "tr-b14", or a standard "STD-B10" of ARIB (Association of Radio Industries and Businesses). The feature amount includes a given ID previously set according to the contents of the program, information indicating a section from which the feature amount is extracted in the program or information indicating time at which the extraction is started, in addition to text data extracted from the program by the feature amount extraction unit 23 as described above.

The search request transmitted by the transmission unit 25 includes a search keyword inputted by the user, a device ID of the information processing device 12 to be a transmission destination as a response with respect to the search request or time-out time designating the time limit until which the request of program information by the search request is valid. The time-out time can be arbitrarily set by the user of the information processing device 12, for example, according to viewing time which can be spent for watching the program. Specifically, the user can set the time after one hour as the time-out time with the input of the search keyword when he/she decides to watch the program for about one hour from the current time. It is also preferable that time set in the information processing device 12 as the default is used as the time-out time.

The receiving unit 26 receives feature information, the search request and the like transmitted from other devices which designate the information processing device 12 as the transmission destination, supplying them to the control unit 29.

The list management unit 27 includes a timer for clocking time, creating or updating the list stored in the list storage unit 28 to manage the list in accordance with control of the timer and the control unit 29.

In the list storage unit 28, a feature information list registering feature information the accumulation of which is allocated to the information processing device 12 or a search request list registering search requests the search of which is requested by other devices are stored.

In respective entries (records) of the feature information list, a feature amount extracted from a program, program information of the program from which the feature amount was extracted, life time indicating a period during which the feature information is stored and the like are registered. The lifetime is set for preventing data stored in the list storage unit 28 from continuing to increase, appropriately set according to the storage capacity of the list storage unit 28.

In respective entries of the search request list, a search keyword included in the search request transmitted to the information processing device 12, a device ID specifying a transmission destination of a response with respect to the search request, time-out time designating the limit during which the request of program information by the search request is valid and the like are registered.

The control unit 29 includes a memory 30, controlling respective units included in the information processing device 12. In the memory 30, the routing table, the neighboring device table of FIG. 1 and the like are stored.

For example, program information of programs received by the tuner 22 is supplied from the tuner 22 to the control unit 29. When the feature amount extraction unit 23 supplies a feature amount extracted from the program received by the tuner 22 to the control unit 29 and the calculation processing unit 24 supplies a hash value calculated from the feature amount to the control unit 29, the control unit 29 refers to the routing table stored in the memory 30 and specifies a device having the device ID closest to the hash value calculated by the calculation processing unit 24 as a transmission destination. Then, the control unit 29 controls the transmission unit 25 to transmit feature information including the feature amount extracted by the feature amount extraction unit 23 and program information of the program from which the feature amount was extracted to the device specified as the transmission destination.

When the receiving unit 26 receives feature information transmitted from another device and supplies the information to the control unit 29, the control unit 29 supplies feature information to the list management unit 27 to be registered in the feature information list stored in the list storage unit 28.

Moreover, when the receiving unit 26 receives the search request transmitted from another device and supplies the request to the control unit 29, the control unit 29 reads program information through the list management unit 27 if the program information requested by the search request is registered in the feature information list stored in the list storage unit 28, controlling the transmission unit 25 to transmit the information to the device which has transmitted the search request. On the other hand, when the program information requested by the search request is not registered, the search request is registered in the search request list stored in the list storage unit 28.

When the operation unit 21 supplies a search keyword inputted by the user to the control unit 29, and the calculation processing unit 24 supplies a hash value calculated from the search keyword inputted by the user to the control unit 29, the control unit 29 refers to the routing table stored in the memory 30 and specifies a device having a device ID which is closest to the hash value calculated by the calculated processing unit 24 as a transmission destination. Then, the control unit 29 controls the transmission unit 25 to transmit the search request requesting program information of the program corresponding to the search keyword to the device specified as the transmission destination.

In order to prevent concentration of processing of transmitting responses and increase of the load imposed on the processing in the information processing device 12, the control unit 29 can allow another device to perform processing of transmitting responses instead of the information processing device 12 when the number of registration in the search request list stored in the list storage unit 28 is equal to or exceeds a predetermined upper limit value.

When the number of registration of the search request list stored in the list storage unit 28 is equal to or exceeds the predetermined upper limit value, the control unit 29 controls the list management unit 27 to create a proxy transfer list by extracting part of the search request registered in the search request list, as well as controls the transmission unit 25 to transmit the proxy transfer list to a given device registered in the search request list. The device ID of the device which has received the proxy transfer list is registered in the search request list of the information processing device 12, therefore, when program information requested by the search request is transmitted to the information processing device 12, the information processing device 12 transmits the program information to the device which has received the proxy transfer list as a response, and the device transfers the response transmitted from the information processing device 12 to the device registered in the proxy transfer list.

Figure 3:
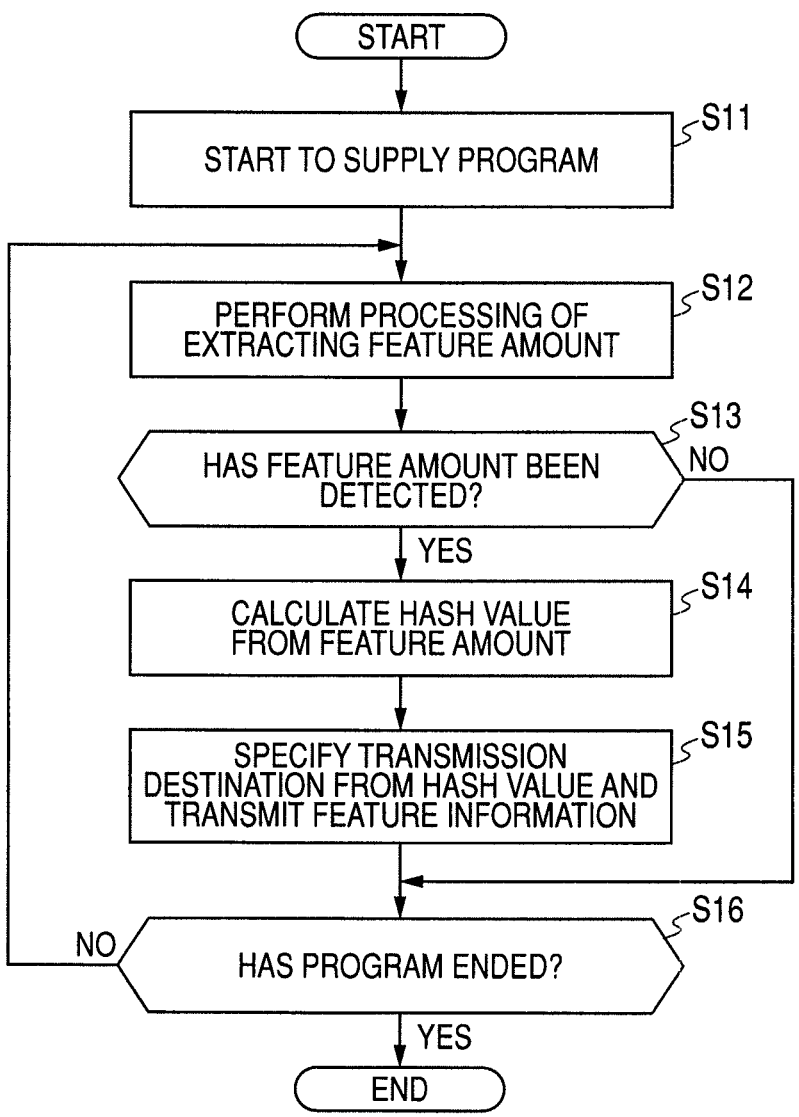
FIG. 3 is a flowchart explaining processing that the information processing device 12 transmits feature information.

Next, FIG. 3 is a flowchart explaining processing that the information processing device 12 of FIG. 2 transmits feature information.

For example, when the tuner 22 receives a broadcast signal of a certain channel and broadcasting of a program is started in the channel, the processing is started and the tuner 22 starts supplying the program to the feature amount extraction unit 23 in Step S11.

After the processing of Step S11, the process proceeds to Step S12, and the feature amount extraction unit 23 performs processing of extracting a feature amount from the program supplied from the tuner 22. The processing of extracting the feature amount from the program is performed, for example, by each frame forming video of the program, and after the processing with respect to one frame is performed, the process proceeds to Step S13.

In Step S13, the feature amount extraction unit 23 determines whether a feature amount has been extracted from the program or not in the processing in Step S12 just before.

When the feature amount extraction unit 23 determines that the feature amount has been extracted from the program in Step S13, the process proceeds to Step S14. On the other hand, when the feature amount extraction unit 23 determines that the feature amount has not been extracted from the program, the process skips Step S14 and Step S15, proceeding to Step S16.

In Step S14, the feature amount extraction unit 23 supplies the feature amount extracted from the program in Step S12 just before to the calculation processing unit 24 and the control unit 29. The calculation processing unit 24 calculates a hash function, taking the feature amount supplied from the feature amount extraction unit 23 as an input value and supplies the hash value obtained as the result of calculation to the control unit 29.

After the processing of Step S14, the process proceeds to Step S15, and the control unit 29 refers to the routing table stored in the memory 30 to search a device ID which is closest to the hash value supplied from the calculation processing unit 24 in Step S14, specifying the device having the device ID as a transmission destination of feature information. Then, the control unit 29 controls the transmission unit 25 to transmit feature information including the feature amount supplied from the feature amount extraction unit 23 and program information of the program from which the feature amount has been extracted to the device specified as the transmission destination.

After the processing of Step S15, the processing proceeds to Step S16, and the control unit 29 determines whether broadcasting of the program started in Step S11 has ended or not.

When the control unit 29 determines that broadcasting of the programs has not ended in Step S16, the process returns to Step S12, in which the feature amount extraction unit 23 performs processing of extracting a feature amount with respect to a next frame to the frame which was the target of processing of extracting the feature amount in Step S12 just before, and the same processing will be repeated subsequently.

On the other hand, when the control unit 29 determines that broadcasting of the program has ended in Step S16, the process ends.

Figure 4:
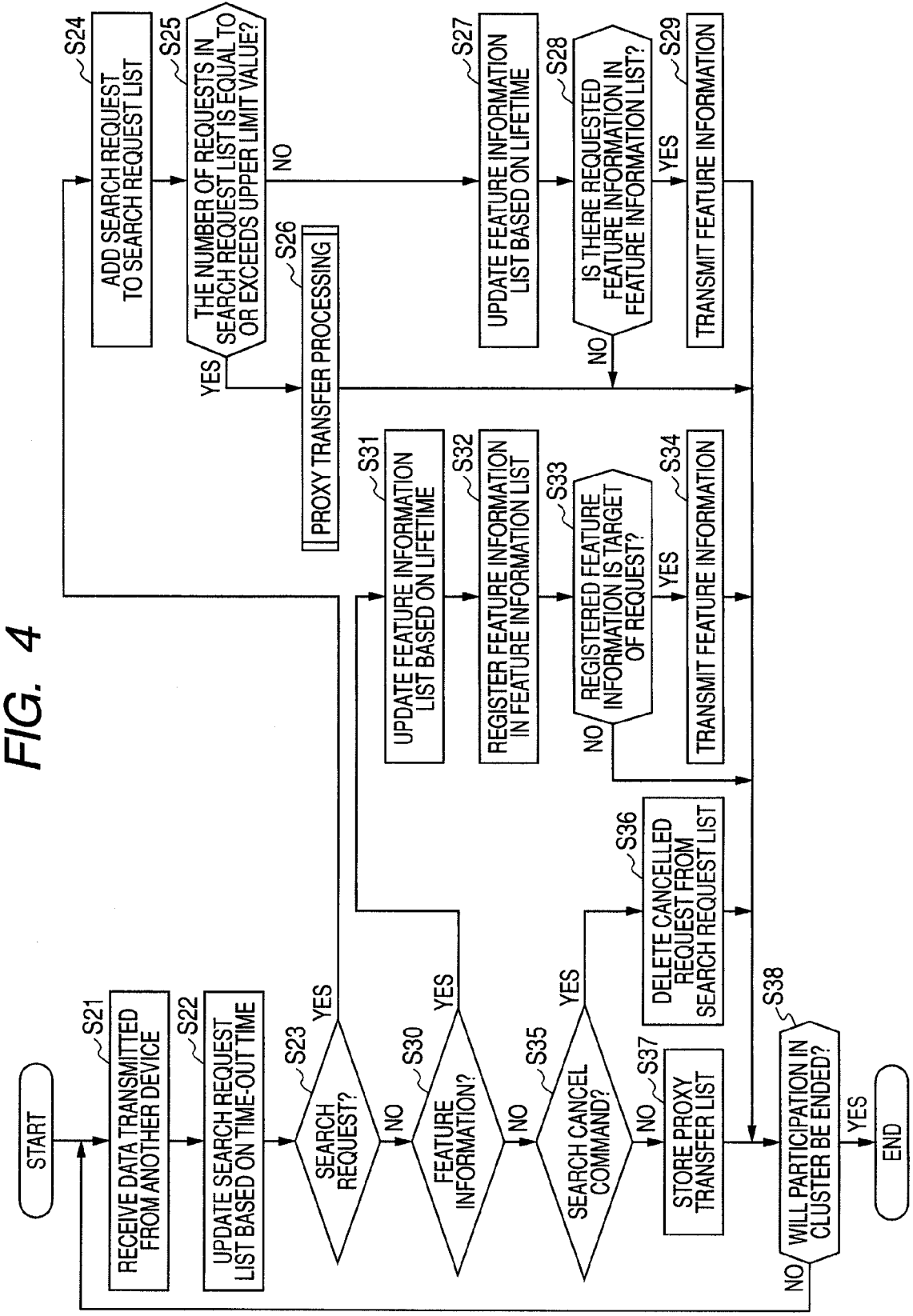
FIG. 4 is a flowchart explaining processing when the information processing device 12 receives data transmitted from another device.

Next, FIG. 4 is a flowchart explaining processing when the information processing device 12 of FIG. 2 receives data (including a request or a command) transmitted from another device.

When the information processing device 12 is connected to the network 11 of FIG. 1 and participates in a cluster, the processing is started and the information processing device 12 waits the processing until data is transmitted from another device in Step S21. Then, when data is transmitted from another device, the receiving unit 26 receives the data to be supplied to the control unit 29, and the process proceeds from Step S21 to Step S22.

In Step S22, the list management unit 27 refers to the internal timer and when there is time-out time which is before the current time, deletes an entry in which the time-out time is registered based on the time-out time registered in the search request list stored in the list storage unit 28. That is, the list management unit 27 deletes the search request whose the time limit until which the request of program information is valid has passed, then, updates the search request list.

After the processing of Step S22, the process proceeds to Step S23, the control unit 29 determines whether data supplied from the receiving unit 26 in Step S21, namely, data transmitted from another device is a search request or not.

When the control unit 29 determines that the data transmitted from another device is the search request in Step S23, the process proceeds to Step S24.

In Step S24, the control unit 29 controls the list management list 27 to add the search request transmitted from another device to the search request list of the list storage unit 28. That is, the control unit 29 controls the list management unit 27 to newly register a search keyword, a device ID and time-out time included in the search request received by the receiving unit 26 in Step S21 in the search request list of the list storage unit 28.

After the processing of Step S24, the process proceeds to Step S25, in which the control unit 29 determines whether the number of search requests registered in the search request list stored in the list storage unit 28 is equal to or exceeds the predetermined upper limit value or not.

When the control unit 29 determines that the number of search requests registered in the search request list is equal to or exceeds the predetermined upper limit value in Step S25, the process proceeds to Step S26, and proxy transfer processing (later-described processing of FIG. 5) is performed.

In the proxy transfer processing in Step S26, a proxy transfer list is created by extracting part of the search request list stored in the list storage unit 28 and the proxy transfer list is transmitted to another information processing device 12. After the processing of proxy transfer processing of Step S26, the process proceeds to Step S38.

On the other hand, in Step S25, when the control device 29 determines that the number of search requests registered in the search request list does not exceed (under) the predetermined upper limit value, the process proceeds to Step S27.

In Step S27, the list management unit 27 refers to the internal timer and when there is a lifetime which has passed the current time, deletes an entry in which the lifetime is registered based on the lifetime registered in the feature information list stored in the list storage unit 28. That is, the list management unit 27 deletes feature information whose lifetime has passed and updates the feature information list.

After the processing of Step S27, the process proceeds to Step S28. The control unit 29 determines whether the program information requested by the search request received by the receiving unit 26 in Step S21 is registered in the feature information list of the list storage unit 28 or not.

For example, the search request includes a performer's name as a search keyword, and when the performer's name corresponds to the feature amount registered in the feature information list, that is, for example, when the name corresponds to a telop extracted from the program or the name recognized from a performer's face appearing on the program, program information of the program from which the feature amount is extracted is the program information requested by the search request.

Therefore, when the control unit 29 refers to the list storage unit 28 through the list management unit 27 and the feature amount corresponding to the search keyword included in the search request is registered in the feature information list, the control unit 29 determines that the program information requested by the search request is registered in the feature information list. On the other hand, when the feature amount corresponding to the search keyword included in the search request is not registered in the feature information list, the control unit 29 determines that the program information requested by the search request is not registered in the feature information list.

When the control unit 29 determines that the program information requested by the search request is registered in the feature information list of the list storage unit 28 in Step S28, the process proceeds to Step S29. On the other hand, when the control unit 29 determines that the program information requested by the search request is not registered in the feature information list of the list storage unit 28, the process skips Step S29 and proceeds to Step S38.

In Step S29, the control unit 29 reads program information requested by the search request from the list storage unit 28 through the list management unit 27. Then, the control unit 29 controls the transmission unit 25 to transmit the program information read from the list storage unit 28 to the device which has transmitted the search request, namely, the device specified by the device ID included in the search request as a response with respect to the search request received by the receiving unit 26 in Step S21. After the processing of Step S29, the process proceeds to Step S38.

On the other hand, when the control unit 29 determines that data transmitted from another device is not the search request in Step S23, the process proceeds to Step S30, and the control unit 29 determines whether data transmitted from another device is feature information or not.

When the control unit 29 determines that data transmitted from another device is feature information in Step S30, the process proceeds to Step S31.

In Step S31, the list management unit 27 updates the search request list in the same manner as the processing in Step S27, then, the process proceeds to Step S32.

In Step S32, the control unit 29 controls the list management unit 27 to register feature information received by the receiving unit 26 in Step S21 in the feature information list stored in the list storage unit 28.

After the processing of Step S32, the process proceeds to Step S33, and the control unit 29 determines whether a search request requesting program information included in feature information registered in the feature information list of the list storage unit 28 in Step S32 is registered in the search request list of the list storage unit 28 or not. That is, the control unit 29 determines whether program information newly registered in the feature information list is program information which has already been requested by another device or not.

When the control unit 29 determines that the search request requesting program information included in the feature information registered in the feature information list of the list storage unit 28 in Step S32 is registered in the search request list of the list storage unit 28 in Step S33, the process proceeds to Step S34. On the other hand, when the control unit 29 determines that it is not registered in the search request list of the list storage unit 28, the process skips Step S34, proceeding to Step S38.

In Step S34, the control unit 29 controls the transmission unit 25 to transmit the feature information received by the receiving unit 26 in Step S21 to a device having a device ID included in the search request requesting the feature information, and the process proceeds to Step S38.

On the other hand, when the control unit 29 determines that data transmitted from another device is not feature information in Step S30, the process proceeds to Step S35, and the control unit 29 determines whether data transmitted from another device is a search cancel command which is the command instructing cancellation of request of program information by search request or not.

When the control unit 29 determines that data transmitted from another device is a search cancel command in Step S35, the process proceeds to Step S36, and the control unit 29 controls the list management unit 27 to delete an entry in which a search keyword whose request of program information is cancelled is registered from the search request list of the list storage unit 28 based on the search cancel command received by the receiving unit 26 in Step S21. After the processing of Step S36, the process proceeds to Step S38.

On the other hand, when the control unit 29 determines that data transmitted from another device is not a search cancel command in Step S35, the process proceeds to Step S37.

When the control unit 29 determines that data transmitted from another device is not the search cancel command, that is, when the control unit 29 determines that data transmitted from another device is not any of the search request, the feature information and the search cancel command, data transmitted from another data is a proxy transfer list transmitted by proxy transfer processing (later-described processing of FIG. 5) being performed by another device.

In Step S37, the control unit 29 controls the list management unit 27 to store the proxy transfer list received by the receiving unit 26 in Step S21 in the list storage unit 28, and the process proceeds to Step S38.

In Step S38, the control unit 29 determines whether participation in the cluster will be ended or not. For example, when the user operates the operation unit 21 so as to cancel the connection to the network 11 of FIG. 1, the control unit 29 determines that the participation in the cluster will be ended.

When the control unit 29 determines that the participation in the cluster will not be ended (the device continues to participate in the cluster) in Step S38, the process returns to Step S21, and the same processing will be repeated subsequently.

On the other hand, when the control unit 29 determines that the participation in the cluster will be ended in Step S38, the process ends.

Figure 5:
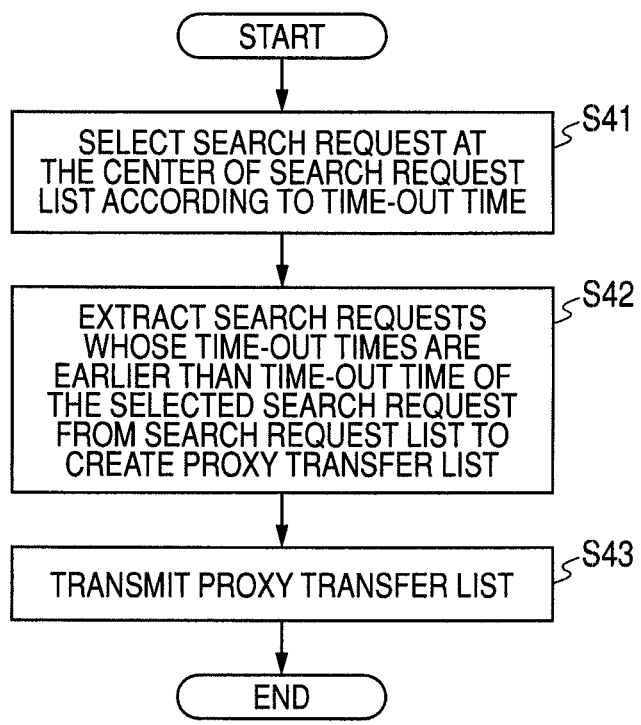
FIG. 5 is a flowchart explaining substitution transfer processing.

Next, FIG. 5 is a flowchart explaining the proxy transfer processing in Step S26 of FIG. 4.

In Step S41, the list management unit 27, when respective entries in the search request list stored in the list storage unit 28 are lined according to time-out time, selects an entry positioned at (approximately) the center of the line.

After the processing of Step S41, the process proceeds to Step S42, and the list management unit 27 selects all entries whose time-out times are earlier than the time-out time of the entry selected in Step S41. Then, the list management unit 27 creates a proxy transfer list including entries selected in Step S42, supplying the list to the control unit 29. The list management unit 27 also deletes entries registered in the proxy transfer list from the search request list in the list storage unit 28, then, the process proceeds to Step S43.

In Step S43, the control unit 29 controls the transmission unit 25 to transmit the proxy transfer list supplied from the list management unit 27 in Step S42 to the device having the device ID registered in the entry selected by the list management unit 27 in Step S41, and the proxy transfer processing ends.

Next, FIG. 6 is a flowchart explaining processing of the information processing device 12 in FIG. 2 which transmits a search request.

When the user operates the operation unit 21 and, for example, inputs a performer's name as a search keyword, the processing is started. In Step S51, the operation unit 21 receives (acquires) the input of the search keyword and supplies the search keyword to the control unit 29, then, the process proceeds to Step S52.

In Step S52, the control unit 29 supplies the search keyword supplied from the operation unit 21 in Step S51 to the calculation processing unit 24. The calculation processing unit 24 calculates a hash function, taking the search keyword supplied from the control unit 29 as an input value, and supplies the hash value obtained as the result of calculation to the control unit 29.

After the processing of Step S52, the process proceeds to Step S53, and the control unit 29 searches a device ID which is closest to the hash value supplied from the calculation processing unit 24 in Step S52 by referring to the routing table stored in the memory 30 to specify the device having the device ID as the transmission destination of the search request. Then, the control unit 29 controls the transmission unit 25 to transmit the search request requesting program information of programs on which the performer having the name inputted as the search keyword appears to the device specified as the transmission destination.

After the processing of Step S53, the process proceeds to Step S54, and the control unit 29 determines whether the request of program information by the search request transmitted in Step S53 will be cancelled or not.

For example, when the control unit 21 is operated so as to cancel the request of program information by designating the search keyword inputted when transmitting the search request, the control unit 29 determines that the request of program information by the search request transmitted in Step S53 will be cancelled.

When the control unit 29 determines that the request of program information will not be cancelled in Step S54, the process proceeds to Step S55.

In Step S55, the control unit 29 determines whether a response to the search request transmitted in Step S53 has been transmitted or not.

When the control unit 29 determines that the response to the search request has been transmitted, for example, when the receiving unit 26 receives the response to the search request and supplies it to the control unit 29 in Step S55, the process proceeds to Step S56. On the other hand, when the control unit 29 determines that the response has not been transmitted, the process skips Step S56 and Step S57, proceeding to the Step S58.

In Step S56, the control unit 29 displays a channel on which the program the search of which was requested on the display unit 32 based on program information as the response supplied by the receiving unit 26 through the tuner 22 and the video cable 31, notifying the user of the broadcasting of the desired program. Then, the control unit 29 displays a GUI (Graphical User Interface) on the display unit 32, which is for allowing the user to select whether watching the program or not, or to select whether the program is recorded in a not-shown recording device or not and the like, performing processing in accordance with the user's selection.

After the processing of Step S56, the process proceeds to Step S57, and when the proxy transfer list in which the search request requesting program information which is the response received by the receiving unit 26 is registered is stored in the list storage unit 28, the control unit 29 controls the transmission unit 25 to transfer the response received by the receiving unit 26 to a device specified by a device ID registered in the proxy transfer list, then, the process proceeds to Step S58.

In Step S58, the control unit 29 determines whether the current time has passed the time-out time included in the search request transmitted in Step S53 or not.

When the control unit 29 determines that the current time has not passed the time-out time in Step S58, the process returns to S54, and the same processing will be repeated subsequently.

On the other hand, when the control unit 29 determines that the request of program information by the search request transmitted in Step S53 will be cancelled, the process proceeds to Step S59.

In Step S59, the control unit 29 determines whether the proxy transfer list for transmitting the response to the search request transmitted in Step S53 instead of the device which transmits the response is stored in the list storage unit 28 or not.

When the control unit 29 determines that the proxy transfer list is stored in the list storage unit 28 in Step S59, the process proceeds to Step S60. On the other hand, when the control unit 29 determines that the proxy transfer list is not stored in the list storage unit 28, the process skips Step S60 and Step S61, proceeding to Step S62.

In Step S60, the control unit 29 controls the list management unit 27 to read the proxy transfer list stored in the list storage unit 28. The control unit 29 controls the transmission unit 25 to transmit the proxy transfer list to a device having a device ID registered in an entry having the longest time-out period in time-out times registered in the proxy transfer list read from the list management list 27.

After the processing of Step S60, the process proceeds to Step S61, and the control unit 29 controls the transmission unit 25 to transfer the search request of the device to which the proxy transfer list has been transmitted in Step S60 (that is, the search request including the device ID of the device registered in the proxy transfer list) to the device which has transmitted the proxy transfer list to the information processing device 12. Accordingly, in the device which has transmitted the proxy transfer list to the information processing device 12, the transmission destination of the response can be changed to the device to which the information processing device 12 has transmitted the proxy transfer list (that is, the device to which the proxy transfer list has been transferred) from the information processing device 12. After the processing of Step S61, the process proceeds to Step S62.

Here, the device which has transmitted the proxy transfer list to the information processing device 12 is the device to which the search request has been transmitted in Step S53. That is, in the device to which the search request has been transmitted in Step S53, since the number of registration of search requests exceeds the predetermined upper limit value, the proxy transfer list has been transmitted to the information processing device 12 registered in the search request list of the device, therefore, the proxy transfer list stored in the list storage unit 28 has been transmitted from the device to which the search request has been transmitted in Step S53.

In Step S62, a command instructing cancellation of the request of program information by the search request is transmitted to the device to which the search request has been transmitted in Step S53, then, the process ends.

Also when the control unit 29 determines that the current time has passed the time-out time in Step S58, the process ends.

As described above, in the information processing system in which the information processing devices 12A to 12E are mutually connected, a search request requiring program information of a certain program is transmitted to a device to which the accumulation of program information of the program is allocated by sharing the program information, therefore, the device can transmit program information requested by the search request to the device which has transmitted the search request. Accordingly, the device which has transmitted the search request can notify the user of a channel in which the desired program is broadcasted, as a result, the user can watch the desired program efficiently.

For example, when programs broadcasted in many channels are analyzed and a channel in which a desired program is broadcasted is notified to the user by using one device, the device have to perform processing of extracting feature amounts from many programs, the load to be imposed on the device becomes large. In addition, it is necessary to provide many tuners, which increases costs. On the other hand, in the case of forming the information processing system including the information processing devices 12A to 12E, the load to be imposed on one device is small, in addition, one device only have to be provided with at least one tuner.

In the information processing system in which the information processing devices 12A to 12E are connected, it is preferable to not only perform transmission and reception of program information but also distribute programs itself. For example, a device transmitting feature information transmits a device ID with the feature information, and a device requesting program information included in the feature information can acquire the device ID with the feature information. Accordingly, the device requiring program information can communicate with the device which has extracted the feature amount and can request the device to distribute the program.

As a feature amount to be extracted from the program, for example, an exponent indicating the degree of excitement in the program can be used in addition to the name of the performer appearing on the program. For example, when the user requests an exciting scene of a sport, the device transmits a search request including a kind of sports and an exponent indicating the degree of excitement in the program. When there is a device which has extracts the excitement indicated by the exponent having higher value than a given value from a program on which the sport is broadcasted, program information transmitted from the device will be transmitted to the device of the user who has requested the exciting scene in the sport.

The processing of extracting the feature amount from the program can be started not only when the user start watching the program but also when the tuner 22 receives the program such that timer recording is started.

As a table to be used in the DHT algorithm, a Chord (ring-shaped skip list), CAN (N-dimensional Torus) or other types of tables can be used.

The series of processing described above can be executed by hardware as well as by software. When the series of processing is executed by software, the software is installed from a program recording medium to a computer in which programs included in the software are incorporated at dedicated hardware or for example, a general-purpose personal computer which can execute various functions by installing various programs.

FIG. 7 is a block diagram showing a configuration example of hardware of a computer which executes the above series of processing according to programs.

In the computer, a CPU (Central Processing Unit) 101, a ROM (Read Only Memory) 102 and a RAM (Random Access Memory) 103 are mutually connected by a bus 104.

An input and output interface 105 is further connected to the bus 104. To the input and output interface 105, an input unit 106 including a keyboard, a mouse, a microphone and the like, an output unit 107 including a display, a speaker and the like, a storage unit 108 including a hard disc, a non-volatile memory and the like, a communication unit 109 including a network interface and the like and a drive 110 driving removable media 111 such as a magnetic disc, an optical disc, a magneto-optical disc or a semiconductor memory are connected.

In the computer configured as the above, the above series of processing is performed by the CPU 101 which executes programs stored in the storage unit 108 by loading them to the RAM 103 through the input and output interface 105 and the bus 104.

Programs executed by the computer (CPU 101) are provided by being recorded in the removable media 111 which are packaged media including a magnetic disc (including a flexible disc), an optical disc (CD-ROM (Compact Disc-Read Only Memory), DVD (Digital Versatile Disc) and the like), an optical magnetic disc or a semiconductor memory, or provided through wired or wireless transmission media such as a local area network, Internet and a digital satellite broadcast.

The programs can be installed in the storage unit 108 by mounting the removable media 111 on the drive 110 through the input and output interface 105. The programs can be also installed in the storage unit 108 by receiving them in the communication unit 109 through wired or wireless transmission media. In addition, the programs can be previously installed in the ROM 102 or the storage unit 108.

It is preferable that the programs executed by the computer can be programs in which processing is performed in time series according to the order described in the specification, or also preferable that the processing is performed in parallel or at necessary timing such as the case when a call is made.

It is not always necessary that the respective processing explained with reference to the above flowcharts are processed in time series along the order described as the flowcharts, and processing executed in parallel or individually (for example, parallel processing or processing by an object) are also included. The programs can be processed by one CPU as well as processed in a distributed manner by plural CPUs.

The embodiment of the invention is not limited to the above embodiment and may be variously modified within the scope not departing from the gist of the invention.

What is claimed is:

1. An information processing device which shares program information specifying a program with other devices connected through a network, comprising:
    a program information receiving unit for receiving the program information, the accumulation of which is allocated to the information processing device based on a feature amount extracted from the program;
    a program information storage unit for storing the program information received by the program information receiving unit;
    a search request receiving unit for receiving a search request which requests program information specifying a program,
    wherein keywords have been extracted as the feature amount from the program information, and
    wherein an exponent indicating a degree of the extracted feature amount has been extracted, and
    wherein the search request includes an exponent indicating a degree of the feature amount requested, allowing transmission of program information matching the keyword and having a higher value of the degree of the amount than the requested degree of the feature amount;
    a determination unit for determining whether the program information requested by the search request received by the search request receiving unit is stored in the program information storage unit or not; and a transmission unit for transmitting program information requested by the search request to another device which has transmitted the search request when it is determined by the determination unit that program information requested by the search request is stored in the program information storage unit.

2. The information processing device according to claim 1, wherein the program information includes information indicating a channel on which the program is broadcasted, information indicating date and hour on which the program is broadcasted and information specifying a device which has transmitted the program information.

3. The information processing device according to claim 1, further comprising:

a search request list storage unit for storing a search request list in which search requests received by the search request receiving unit are registered, and wherein the determination unit further determines whether the program information received by the program information receiving unit is requested in search requests already registered in the search request list or not, and wherein the transmission unit transmits program information requested by the search request to another device which has transmitted the search request when it is determined by the determination unit that the program information received by the program information receiving unit is requested in search requests already registered in the search request list.

4. The information processing device according to claim 1, further comprising:

a keyword acquisition unit for acquiring a search keyword inputted by the user;

a calculation unit for calculating a hash function and outputting a hash value, taking the search keyword acquired by the keyword acquisition unit as an input value; and a specifying unit for specifying a device to which the accumulation of program information is allocated, which specifies a program from which the search keyword has been extracted as a feature amount on the basis of the hash value outputted from the calculation unit, and wherein the transmission unit further transmits a search request requesting program information which specifies the program from which the search keyword has been extracted as the feature amount to the device specified by the specifying unit.

5. The information processing device according to claim 1, further comprising:

a program receiving unit for receiving the program and the program information which specifies the program;

a feature amount extraction unit for extracting a feature amount from the program received by the program receiving unit;

a calculation unit for calculating a hash function and outputting a hash value, taking the feature amount extracted by the feature amount extraction unit as an input value;

and a specifying unit for specifying a device to which the accumulation of program information is allocated, which specifies the program from which the feature amount extraction unit has extracted the feature amount on the basis of the hash value outputted from the calculation unit, and wherein the transmission unit further transmits program information which specifies the program from which the feature amount extraction unit has extracted the feature amount to the device specified by the specifying unit.

6. The information processing device according to claim 3, wherein the search request includes time-out time designating the limit until which the request of the program information is valid, and further comprising:

a search request cancellation unit for canceling the search request in which the limit designated by the time-out time has passed from the search request list by referring to the search request list stored in the search request list storage unit.

7. The information processing device according to claim 3, further comprising:

a proxy transfer list creation unit for creating a proxy transfer list made by extracting part of search requests from the search request list when the number of search requests registered in the search request list stored in the search request list storage unit is equal to or exceeds a predetermined upper limit value; and a proxy transfer list transmission unit for transmitting the proxy transfer list to one of other devices which have transmitted the search requests registered in the search request list.

8. An information processing method of an information processing device which shares program information which specifies a program with other devices connected through a network, comprising the steps of:

receiving the program information the accumulation of which is allocated to the information processing device based on a feature amount extracted from the program;

storing the program information the accumulation of which is allocated to the information processing device in a program information storage unit for storing the program information;

receiving a search request which requests program information specifying a program, wherein keywords have been extracted as the feature amount from the program information, and wherein an exponent indicating a degree of the extracted feature amount has been extracted, wherein the search request includes an exponent indicating a degree of the feature amount requested, allowing transmission of program information matching the keyword and having a higher value of the degree of the feature amount than the requested degree of the feature amount;

determining whether the program information requested by the search request is stored in the program information storage unit or not, and transmitting program information requested by the search request to another device which has transmitted the search request when it is determined that program information requested by the search request is stored in the program information storage unit.

9. A non-transitory computer readable medium, which contains a program allowing a computer to execute information processing of an information processing device which shares program information which specifies a program with other devices connected through a network, comprising the steps of:

receiving the program information the accumulation of which is allocated to the information processing device based on a feature amount extracted from the program;

storing the program information the accumulation of which is allocated to the information processing device in a program information storage unit for storing the program information;

receiving a search request which requests program information specifying a program, wherein keywords have been extracted as the feature amount from the program information, and wherein an exponent indictating a degree of the extracted feature amount has been extratced, wherein the search request includes an exponent indicating a degree of the feature amount requested, allowing transmission of program information matching the keyword and having a higher value of the degree of the feature amount than the requested degree of the feature amount;

determining whether the program information requested by the search request is stored in the program information storage unit or not, and transmitting program information requested by the search request to another device which has transmitted the search request when it is determined that program information requested by the search request is stored in the program information storage unit.

10. An information processing device which shares program information specifying a program with other devices connected through a network, comprising:

a program information receiving unit configured to receive the program information the accumulation of which is allocated to the information processing device based on a feature amount extracted from the program;

a program information storage unit configured to store the program information received by the program information receiving unit;

a search request receiving unit configured to receive a search request which requests program information specifying a program, wherein keywords have been extracted as the feature amount from the program information, wherein an exponent indicating a degree of the extracted feature amount has been extracted, and wherein the search request includes an exponent indicating a degree of the feature amount requested, allowing transmission of program information matching the keyword and having a higher value of the degree of the feature amount than the requested degree of the feature amount;

a determination unit configured to determine whether the program information requested by the search request received by the search request receiving unit is stored in the program information storage unit or not; and a transmission unit configured to transmit program information requested by the search request to another device which has transmitted the search request when it is determined by the determination unit that program information requested by the search request is stored in the program information storage unit.

* * * * *